United States Patent [19]

Staendeke et al.

[11] Patent Number: 5,093,199
[45] Date of Patent: Mar. 3, 1992

[54] STABILIZED RED PHOSPHORUS

[75] Inventors: Horst Staendeke, Lohmar; Ursus Thümmler, Erftstadt, both of Fed. Rep. of Germany

[73] Assignee: Hoechst Aktiengesellschaft, Frankfurt am Main, Fed. Rep. of Germany

[21] Appl. No.: 458,845

[22] Filed: Dec. 29, 1989

[30] Foreign Application Priority Data

Jan. 14, 1989 [DE] Fed. Rep. of Germany ....... 3900965

[51] Int. Cl.$^5$ ............................................ C01B 25/023
[52] U.S. Cl. ................................. 428/403; 423/265; 423/274; 423/322
[58] Field of Search ................ 428/403; 423/265, 322, 423/274; 149/29; 252/397, 609

[56] References Cited

U.S. PATENT DOCUMENTS

| | | | |
|---|---|---|---|
| 2,359,243 | 9/1944 | Pernert | 427/215 |
| 2,635,953 | 4/1953 | Silverstein et al. | 149/30 |
| 3,725,337 | 4/1973 | Villa | 524/85 |
| 4,210,630 | 7/1980 | Dany et al. | 423/265 |
| 4,853,288 | 4/1989 | Staendeke et al. | 428/402.24 |

Primary Examiner—George F. Lesmes
Assistant Examiner—Christopher Brown
Attorney, Agent, or Firm—Connolly & Hutz

[57] ABSTRACT

In a stabilized, pulverulent red phosphorus comprising phosphorus particles having a maximum particle size of 2 mm whose surface is covered with a thin layer of an oxidation stabilizer, the oxidation stabilizer is composed of tin oxide hydrate.

2 Claims, No Drawings

STABILIZED RED PHOSPHORUS

The invention relates to stabilized, pulverulent red phosphorus comprising phosphorus particles having a maximum particle size of 2 mm, the surface of the phosphorus particles being covered with a thin layer of an oxidation stabilizer, and to a process for preparing the product according to the invention.

Red phosphorus is obtained, as is known, by thermal transformation of yellow phosphorus into the more stable red modification. After completion of the reaction, the crude red phosphorus containing about 0.5-1.5% by mass of yellow phosphorus, forms a compact mass. It is ground under an inert gas atmosphere and freed of yellow phosphorus by boiling in aqueous suspension with dilute sodium hydroxide solution. More recently, the transformation is carried out in rotary reactors, the red phosphorus being obtained as a powder. The aqueous red phosphorus suspension taken from the reactor is heated with steam in stirred vessels and freed of the residual content of about 0.1% by mass of yellow phosphorus by addition of sodium hydroxide solution in portions.

Red phosphorus is required in pyrotechnology and for the production of friction coatings for matches, and is used as a flameproofing agent for plastics, such as, for example, polyamides or polyurethanes.

As is know, a chemical reaction takes place on the surface of red phosphorus in a moist atmosphere, during which various acids of phosphorus in oxidation stages +1 to +5 and hydrogen phosphide are formed by oxidation and disproportionation.

It was therefore the object to improve the inadequate oxidation stability of red phosphorus by stabilization.

The term stabilization is here to be understood as a measure which provides the red phosphorus with better protection against atmospheric influences and thus, for example during storage or further processing, contributes to a reduction in the formation of oxoacids of phosphorus and of hydrogen phosphide.

For stabilizing red phosphorus, aluminum hydroxide has already been proposed (Gmelins Handbuch der anorganischen Chemie [Gmelin's Handbook of Inorganic Chemistry], 8th edition, 1964, Phosphorus Volume, Part B, page 83, Verlag Chemie, Weinheim/Bergstrasse). The latter is precipitated upon the phosphorus particles by successive addition of aqueous 10% solutions, heated to 55°-60° C., of sodium hydrogen carbonate and aluminum sulfate. The aqueous suspension is then filtered and the filter residue is dried. This procedure has the disadvantage that, in order to achieve an adequate stabilizing effect, undesirably large quantities of aluminum hydroxide must be applied, so that the phosphorus is contaminated to an extent which is intolerable with regard to its further use in most diverse fields of application.

Another process for stabilizing red phosphorus (U.S. Pat. No. 2,359,243) provides for suspending the red phosphorus in an aqueous 0.04-normal solution of sodium aluminate, whereupon air is passed through the suspension at 85°-90° C. for 10 hours, and the phosphorus is filtered off, washed with hot water and dried in vacuo.

Furthermore, it is known from U.S. Pat. No. 2,635,953 to use also zinc hydroxide or magnesium hydroxide apart from aluminum hydroxide for the stabilization of red phosphorus.

Moreover, German Offenlegungsschrift 2,813,151 (=U.S. Pat. No. 4,210,630) proposes to use a mixture of aluminum hydroxide and lead hydroxide for the stabilization of red phosphorus.

The processes mentioned so far are unable to ensure the satisfactory extent of stabilization of the red phosphorus from oxidation, with a minimum of stabilizer. In fact, these known oxidation stabilizers have the disadvantage that they are not sufficiently heat-stable, because they eliminate water at elevated temperatures. In extrusion-processing of plastics which contain red phosphorus as a flameproofing agent, the red phosphorus in turn containing an oxidation stabilizer, however, it is imperative that the oxidation stabilizer is heat-stable and does not eliminate any water even at temperatures above 300° C. and does not decompose.

Surprisingly, it has now been found that the oxidation stability of red phosphorus can be very effectively improved by precipitation thereon of tin oxide hydrate. This is surprising and unforeseeable for the reason that the known stabilizers, aluminum hydroxide and zinc hydroxide, are comparatively ineffective even at high concentrations (see Table 1).

The invention now relates to stabilized, pulverulent red phosphorus comprising phosphorus particles having a maximum particle size of 2 mm, the surface of the phosphorus particles being covered with a thin layer of an oxidation stabilizer which is composed of tin oxide hydrate, preferably predominantly of tin(II) oxide hydrate. The quantity of the oxidation stabilizer is herein preferably 4-20% by mass, in particular 4-10% by mass, relative to the quantity of red phosphorus.

The process for the preparation of the stabilized, pulverulent red phosphorus comprises, according to the invention, introducing a water-soluble tin compound into an aqueous suspension of the red phosphorus, adjusting the pH to a value of 6-8, stirring for 0.5-3 hours at a temperature of 40°-80° C. and, after filtration, finally drying the phosphorus particles at an elevated temperature.

Advantageously, the final drying should be carried out at temperatures of 80°-120° C. in a stream of nitrogen.

The following illustrative examples and tables serve to explain the invention in more detail. The percentage data are % by mass.

Determination of the oxidation stability

The determination of the oxidation stability was carried out according to a moist/warm storage test.

For this purpose, 5.0 g of red phosphorus (particle size: 100% smaller than 150 μm) were weighed into a crystallizing dish having a diameter of 50 mm, and the dish was stored in a closed glass vessel for 168 hours at 65° C. or 80° C. and 100% relative atmospheric humidity. The hydrogen phosphide thus formed was either expelled by an air stream (10 l/hour) out of a glass vessel and reacted in a gas washbottle with a 2.5% by mass mercury(II) chloride solution and the quantity of the hydrochloric acid thus formed was determined by titrimetry, or detected by means of a "hydrogen phosphide 50/a" DRÄGER tube.

For the determination of the content of the various oxoacids of phosphorus, the phosphorus sample was transferred into a 250 ml glass beaker, 200 ml of 1% hydrochloric acid were added, and the mixture was heated to the boil for 10 minutes and then filtered. The determination of the acid-soluble phosphorus in the filtrate was then carried out by the photometric molybdatovanadato-phosphoric acid method.

For the determination of the initial value of acid-soluble phosphorus, the red phosphorus is subjected to the same analytical procedure without a preceding moist/warm storage. This value is then subtracted in the determination of the, content of acid-soluble phosphorus after the moist/warm storage.

EXAMPLE 1 (COMPARISON EXAMPLE)

500 ml of an aqueous phosphorus suspension having a content of 250 g of red phosphorus (particle size: 100% smaller than 150 μm) were diluted in a 2 liter stirred glass reactor with 250 ml of water and heated to 60° C. 6 g of aluminum hydroxide were then dissolved in 20 ml of 50% sodium hydroxide solution and added to the RED PHOSPHORUS suspension. The pH was adjusted to a value of 7 by addition of 5% sulfuric acid; the suspension was then stirred for 1 hour at 60° C.

After filtration, the filter residue was washed with water and dried at 100° C. in a stream of nitrogen. In the analysis, an aluminum hydroxide content of 2.5% was found. The values for the oxidation stability are listed in Table 1.

EXAMPLE 2 (COMPARISON EXAMPLE)

The procedure was analogous to Example 1, but 12 g of aluminum hydroxide were used. In the analysis, an aluminum hydroxide content of 4.7% was found.

The values for the oxidation stability are listed in Table 1.

EXAMPLE 3 (COMPARISON EXAMPLE)

The procedure was analogous to Example 1, but 18 g of aluminum hydroxide were used. In the analysis, an aluminum hydroxide content of 6.9% was found.

The values for the oxidation stability are listed in Table 1.

EXAMPLE 4 (COMPARISON EXAMPLE)

The procedure was analogous to Example 1, but 25 g of aluminum hydroxide were used. In the analysis, an aluminum hydroxide content of 9.5% was found.

The values for the oxidation stability are listed in Table 1.

EXAMPLE 5 (COMPARISON EXAMPLE)

The procedure was analogous to Example 1, but 6 g of zinc oxide were used. In the analysis, a zinc hydroxide content of 2.9% was found.

The values for the oxidation stability are listed in Table 1.

EXAMPLE 6 (COMPARISON EXAMPLE)

The procedure was analogous to Example 1, but 12.5 g of zinc oxide were used. In the analysis, a zinc hydroxide content of 6.3% was found.

The values for the oxidation stability are listed in Table 1.

EXAMPLE 7 (COMPARISON EXAMPLE)

The procedure was analogous to Example 1, but 19 g of zinc oxide were used. In the analysis, a zinc hydroxide content of 9.3% was found.

The values for the oxidation stability are listed in Table 1.

EXAMPLE 8 (COMPARISON EXAMPLE)

The procedure was analogous to Example 1, but 25 g of zinc oxide were used. In the analysis, a zinc hydroxide content of 11.3% was found.

The values for the oxidation stability are listed in Table 1.

EXAMPLE 9 (ACCORDING TO THE INVENTION)

The procedure was analogous to Example 1, but 3.7 g of tin(II) chloride, $SnCl_2.2H_2O$, were used. In the analysis, a tin oxide hydrate content of 0.9% (calculated as SnO) was found.

The values for the oxidation stability are listed in Table 1.

EXAMPLE 10 (ACCORDING TO THE INVENTION)

The procedure was analogous to Example 1, but 7.4 g of tin(II) chloride were used. In the analysis, a tin oxide hydrate content of 1.7% (calculated as SnO) was found. The values for the oxidation stability are listed in Table 1.

EXAMPLE 11 (ACCORDING TO THE INVENTION)

The procedure was analogous to Example 1, but 11 g of tin(II) chloride were used. In the analysis, a tin oxide hydrate content of 2.5% (calculated as SnO) was found. The values for the oxidation stability are listed in Table 1.

EXAMPLE 12 (ACCORDING TO THE INVENTION)

The procedure was analogous to Example 1, but 15 g of tin(II) chloride were used. In the analysis, a tin oxide hydrate content of 3.3% (calculated as SnO) was found. The values for the oxidation stability are listed in Table 1.

EXAMPLE 13 (ACCORDING TO THE INVENTION)

The procedure was analogous to Example 1, but 21 g of tin(II) chloride were used. In the analysis, a tin oxide hydrate content of 4.4% (calculated as SnO) was found.

The values for the oxidation stability are listed in Table 1.

EXAMPLE 14 (ACCORDING TO THE INVENTION)

The procedure was analogous to Example 1, but 26 g of tin(II) chloride were used. In the analysis, a tin oxide hydrate content of 5.7% (calculated as SnO) was found. The values for the oxidation stability are listed in Table 1.

EXAMPLE 15 (ACCORDING TO THE INVENTION)

The procedure was analogous to Example 1, but 31.5 g of tin(II) chloride were used. In the analysis, a tin oxide hydrate content of 6.4% (calculated as SnO) was found. The values for the oxidation stability are listed in Table 1.

EXAMPLE 16 (ACCORDING TO THE INVENTION)

The procedure was analogous to Example 1, but 37 g of tin(II) chloride were used. In the analysis, a tin oxide hydrate content of 7.4% (calculated as SnO) was found. The values for the oxidation stability are listed in Table 1.

EXAMPLE 17 (ACCORDING TO THE INVENTION)

The procedure was analogous to Example 1, but 42 g of tin(II) chloride were used. In the analysis, a tin oxide hydrate content of 8.5% (calculated as SnO) was found. The values for the oxidation stability are listed in Table 1.

TABLE 1:

| | Oxidation stabilizer | | Determination of the oxidation stability Moist/warm storage test | | | |
|---|---|---|---|---|---|---|
| | | | at 65° C./100% rel. humidity | | at 80° C./100% rel. humidity | |
| Example | Type | Concentration (%) | mg of $PH_3$/g × day | mg of P/g × day[1] | mg of $PH_3$/g × day | mg of P/g × day[1] |
| 1 (comparison) | $Al(OH)_3$ | 2.5 | 0.36 | 2.3 | 1.3 | 11.8 |
| 2 (comparison) | $Al(OH)_3$ | 4.7 | 0.24 | 2.2 | 0.87 | 8.7 |
| 3 (comparison) | $Al(OH)_3$ | 6.9 | 0.22 | 2.8 | 0.95 | 5.5 |
| 4 (comparison) | $Al(OH)_3$ | 9.5 | 0.32 | 3.2 | 1.0 | 8.4 |
| 5 (comparison) | $Zn(OH)_2$ | 2.9 | 0.21 | 1.3 | 1.1 | 7.0 |
| 6 (comparison) | $Zn(OH)_2$ | 6.3 | 0.33 | 1.6 | 1.4 | 6.8 |
| 7 (comparison) | $Zn(OH)_2$ | 9.3 | 0.31 | 1.6 | 1.5 | 7.2 |
| 8 (comparison) | $Zn(OH)_2$ | 11.3 | 0.30 | 2.0 | 2.0 | 9.3 |
| 9 (invention) | $SnO \cdot H_2O$[2] | 0.9 | 1.0 | 7.2 | 1.8 | 13.3 |
| 10 (invention) | $SnO \cdot H_2O$ | 1.7 | 0.30 | 2.3 | 0.82 | 5.4 |
| 11 (invention) | $SnO \cdot H_2O$ | 2.5 | 0.25 | 0.63 | 0.79 | 3.6 |
| 12 (invention) | $SnO \cdot H_2O$ | 3.3 | 0.21 | <0.05 | 0.55 | 2.6 |
| 13 (invention) | $SnO \cdot H_2O$ | 4.4 | 0.15 | <0.05 | 0.28 | 0.21 |
| 14 (invention) | $SnO \cdot H_2O$ | 5.7 | 0.15 | <0.05 | 0.25 | 0.10 |
| 15 (invention) | $SnO \cdot H_2O$ | 6.4 | 0.14 | <0.05 | 0.25 | 0.08 |
| 16 (invention) | $SnO \cdot H_2O$ | 7.4 | 0.12 | <0.05 | 0.25 | <0.05 |
| 17 (invention) | $SnO \cdot H_2O$ | 8.5 | 0.12 | <0.05 | 0.22 | <0.05 |

[1] The increase in acid-soluble phosphorus was determined
[2] Because of the difficulty in allocating a well defined chemical formula to tin oxide hydrates, an SnO content was calculated from the tin content determined analytically.

We claim:

1. Stabilized, pulverulent red phosphorus consisting of phosphorus particles having a maximum particle size of 2 mm, the surface of the phosphorus particles being covered with a thin layer of tin oxide hydrate as an oxidation stabilizer.

2. Stabilized red phosphorus as claimed in claim 1, wherein the quantity of the oxidation stabilizer is 4 to 20% by mass, relative to the quantity of red phosphorus.

* * * * *